(12) United States Patent
Kato et al.

(10) Patent No.: US 7,312,808 B2
(45) Date of Patent: Dec. 25, 2007

(54) IMAGE FORMING APPARATUS AND SCANNING UNIT

(75) Inventors: Ryota Kato, Nagoya (JP); Taizo Matsuura, Ama-gun (JP); Toshio Sakai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 449 days.

(21) Appl. No.: 11/089,336

(22) Filed: Mar. 25, 2005

(65) Prior Publication Data
US 2005/0221907 A1 Oct. 6, 2005

(30) Foreign Application Priority Data

| Mar. 31, 2004 | (JP) | 2004-105504 |
| Mar. 31, 2004 | (JP) | 2004-107321 |
| Aug. 4, 2004 | (JP) | 2004-228162 |
| Aug. 4, 2004 | (JP) | 2004-228163 |

(51) Int. Cl.
  *G02B 26/10* (2006.01)
(52) U.S. Cl. ................................ 347/145; 347/263
(58) Field of Classification Search ........ 347/241–245, 347/256–261, 263
See application file for complete search history.

(56) References Cited

U.S. PATENT DOCUMENTS

| 4,731,623 | A | 3/1988 | Oda et al. |
| 5,255,112 | A | 10/1993 | Hori et al. |
| 6,078,764 | A | 6/2000 | Akutsu |
| 6,311,026 | B1 | 10/2001 | Higeta et al. |
| 6,385,414 | B1 | 5/2002 | Sato et al. |
| 2001/0026392 | A1 | 10/2001 | Hama et al. |
| 2003/0175042 | A1 | 9/2003 | Nishimura |
| 2003/0185588 | A1 | 10/2003 | Takami et al. |
| 2004/0100673 | A1 | 5/2004 | Sakai |
| 2005/0220494 | A1* | 10/2005 | Kato et al. .......... 399/184 |

FOREIGN PATENT DOCUMENTS

| JP | A 59-45466 | 3/1984 |
| JP | U 59-173638 | 11/1984 |
| JP | A 4-329557 | 11/1992 |
| JP | A 5-297649 | 11/1993 |
| JP | A 6-106819 | 4/1994 |
| JP | A 6-308793 | 11/1994 |
| JP | A 7-244410 | 9/1995 |
| JP | A 8-30180 | 2/1996 |

(Continued)

*Primary Examiner*—Huan Tran
(74) *Attorney, Agent, or Firm*—Oliff & Berridge, PLC

(57) ABSTRACT

After having been reflected by a first return mirror, a light beam deflected by a polygon mirror is caused to travel toward a second return mirror disposed in a position below a base section of the polygon mirror by way of an opening. An image forming apparatus is configured so as to satisfy a relationship of a<b and another relationship of c<b, given that an optical path length from a reflection surface of the polygon mirror to a reflection surface of the first return mirror is taken as "a"; another optical path length from the reflection surface of the first return mirror to a reflection surface of the second return mirror is taken as "b"; and still another optical path length from the reflection surface of the second return mirror to the surface of the photosensitive member is taken as "c."

14 Claims, 7 Drawing Sheets

FOREIGN PATENT DOCUMENTS

| | | |
|---|---|---|
| JP | A 9-185201 | 7/1997 |
| JP | A 9-185202 | 7/1997 |
| JP | A 10-116014 | 5/1998 |
| JP | A 10-254327 | 9/1998 |
| JP | A 11-155034 | 6/1999 |
| JP | A 11-202734 | 7/1999 |
| JP | A 2000-147960 | 5/2000 |
| JP | A 2000-347472 | 12/2000 |
| JP | A 2001-42586 | 2/2001 |
| JP | A 2001-100493 | 4/2001 |
| JP | A 2001-175123 | 6/2001 |
| JP | A 2001-282075 | 10/2001 |
| JP | A 2002-062711 | 2/2002 |
| JP | A 2003-76249 | 3/2003 |
| JP | A 2003-271030 | 9/2003 |
| JP | A 2003-295720 | 10/2003 |
| JP | A 2004-163463 | 6/2004 |

* cited by examiner

IMAGE FORMING APPARATUS AND SCANNING UNIT

BACKGROUND OF THE INVENTION

1. Field of the Invention

The present invention relates to an image forming apparatus and a scanning unit, and more particularly, to an image forming apparatus equipped with a scanning unit which scans and exposes the surface of a photosensitive member by means of emitting a light beam, as well as to a scanning unit provided in the image forming apparatus.

2. Description of the Related Art

An electrophotographic image-forming apparatus, such as a laser printer, forms an image by means of: deflecting a light beam emitted from a light-emitting section including a light source, such as a semiconductor laser or the like, by a deflector such as an polygon mirror; scanning and exposing a uniformly-charged surface of the photosensitive member to thus form a latent image; rendering the latent image visible with toner; and transferring a toner image on a recording medium, such as a recording sheet or the like.

A scanning apparatus that exposes and scans the surface of the photosensitive member by emitting a light beam requires highly accurate assembly in relation to the light-emitting position of a light source such as a semiconductor laser, the position of a polygon mirror, and the position of a scanning optical system, or the like, which guides a light beam to a photosensitive member.

As described in, e.g., JP-A-2004-163463 (see FIG. 1), when a conventional scanning unit is mounted on an image forming apparatus, a rigid-body plate, such as a steel plate, is usually disposed above a process unit equipped with a photosensitive drum or the like, in a direction orthogonal to the paper transport direction, to thus place the scanning unit above the rigid-body plate. In many cases, the light beam deflected by the deflector, such as a polygon mirror, is reflected by three return mirrors and guided to the surface of the photosensitive member.

SUMMARY OF THE INVENTION

If a printer can be disposed in a space which is not very large; e.g., a space on a desk, convenience is afforded to a user who uses a printer in an ordinary household. Hence, considerably strong demand has arisen for miniaturizing an image forming apparatus, such as a laser printer. However, as described in connection with JP-A-2004-163463, when the light beam is guided to the photosensitive member through use of three return mirrors, difficulty is encountered in miniaturizing (particularly slimming down) the scanning unit to a given size. This in turn poses difficulty in miniaturizing (particularly, shortening a height of) an apparatus.

The present invention provides an image forming apparatus and a scanning unit, which can be miniaturized to a great extent.

According to an aspect of the present invention, there is provided an image forming apparatus including: a photosensitive member; a scanning unit that exposes and scans a surface of the photosensitive member by emitting a light beam, the scanning unit including a unit frame that has a base section having an opening and an outer peripheral wall surrounding a rim of the base section; a deflector that is disposed on an upper surface side of the base section and deflects the light beam toward the outer peripheral wall; a first reflection optical element that is disposed with the opening being interposed between the first reflection optical element and the deflector and reflects the light beam, which has been deflected by the deflector and travels toward the outer peripheral wall, toward a position below the base section; and a second reflection optical element that is disposed on a lower surface side of the base section and reflects the light beam, which travels after having been reflected by the first reflection optical element and passed through the opening, toward the photosensitive member; wherein an angle between the light beam entering the first reflection optical element and the light beam reflected from the first reflection optical element toward the second reflection optical element is an acute angle; and a relationship of a<b and another relationship of c<b are satisfied, given that an optical path length from a reflection surface of the deflector to a reflection surface of the first reflection optical element is taken as "a"; another optical path length from the reflection surface of the first reflection optical element to a reflection surface of the second reflection optical element is taken as "b"; and still another optical path length from the reflection surface of the second reflection optical element to the surface of the photosensitive member is taken as "c."

This configuration requires only two reflection optical elements, such as return mirrors. The angle formed between the light beam entering the first reflection optical element and the light beam reflected from the first reflection optical element toward the second reflection optical element is made an acute angle, and the optical path length from the first reflection optical element to the second reflection optical element is made long. Thereby, a sufficient optical path length can also be ensured. Accordingly, an attempt can be made to shorten the distance between the scanning unit and the photosensitive member, thereby miniaturizing (particularly, shortening the height of) the image forming apparatus.

According to another aspect of the invention, there is provided a scanning unit that exposes and scans an object of scanning by emitting a light beam, including: a unit frame that has a base section having an opening and an outer peripheral wall surrounding a rim of the base section; a deflector that is disposed on an upper surface side of the base section and deflects the light beam toward the outer peripheral wall; a first reflection optical element that is disposed with the opening being interposed between the first reflection optical element and the deflector and reflects the light beam, which has been deflected by the deflector and travels toward the outer peripheral wall, toward a position below the base section; and a second reflection optical element that is disposed on a lower surface side of the base section and reflects the light beam, which travels after having been reflected by the first reflection optical element and passed through the opening, toward the photosensitive member; wherein an angle between the light beam entering the first reflection optical element and the light beam reflected from the first reflection optical element is an acute angle; and a relationship of a<b is satisfied, given that an optical path length from a reflection surface of the deflector to a reflection surface of the first reflection optical element is taken as "a" and another optical path length from the reflection surface of the first reflection optical element to a reflection surface of the second reflection optical element is taken as "b."

According to the image forming apparatus and the scanning unit, the optical path of the light beam in the scanning unit is formed into an essentially wedge-shaped geometry. By means of this, only two reflection optical elements, such as return mirrors, are required. Consequently, this is advantageous in miniaturizing and slimming down the entire scanning unit. Further, an optical path length between the first reflection optical element and the second reflection optical element is made long, so that a sufficient optical path length can be ensured within the scanning unit. Hence, an attempt can be made to shorten the distance between the scanning unit and the photosensitive member, which in turn yields an advantage of the ability to miniaturize the overall image forming apparatus.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
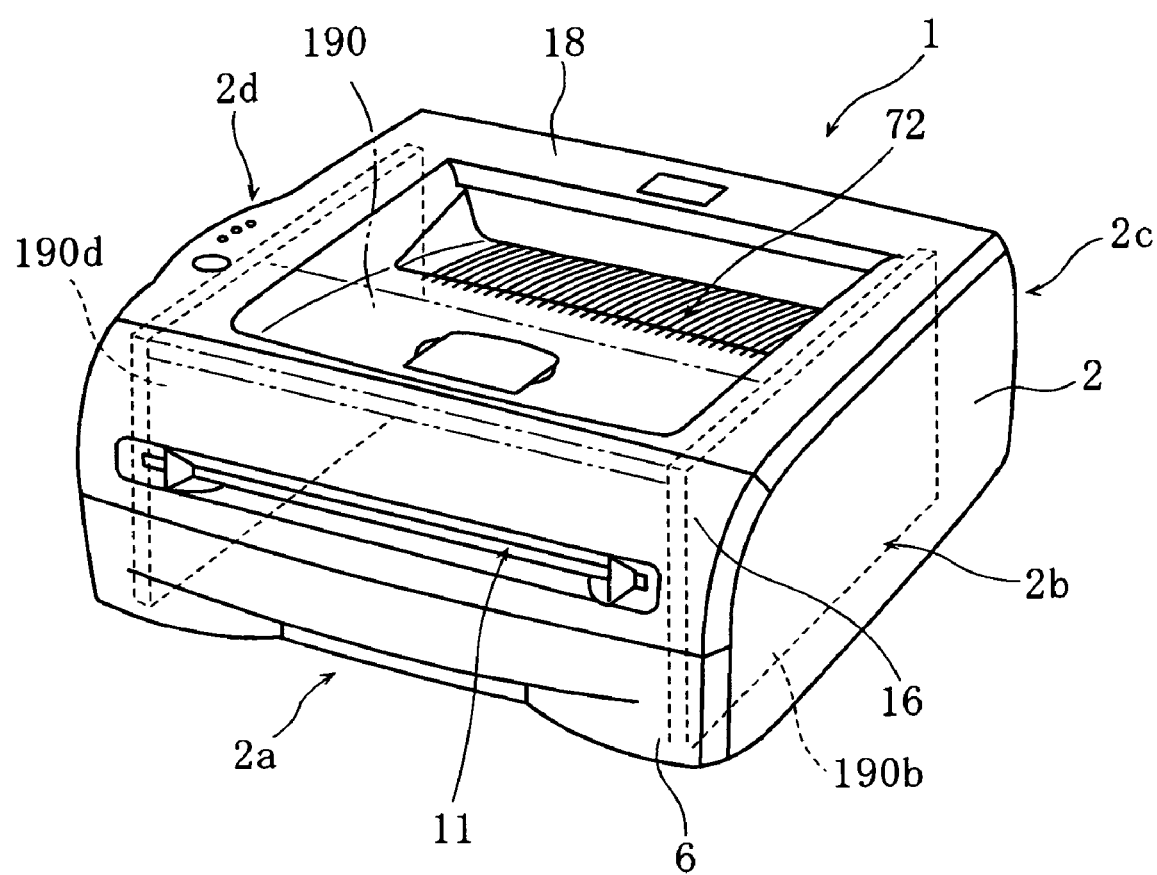
FIG. 1 is a perspective view showing the appearance of a laser printer employed as an example image forming apparatus according to an embodiment of the present invention.

A deflector in an embodiment of the present invention is disposed at one of two opposing ends of an upper surface of a base section, and a first reflection optical element is disposed at the other end of the two ends. Further, a second reflection optical element is disposed via the base section at the one end of the two ends and a position below the deflector. This configuration is effective for miniaturizing the overall scanning unit.

The scanning unit can include a first scanning lens interposed between the deflector and the first reflection optical element; and a second scanning lens interposed between the first reflection optical element and the second reflection optical element. More specifically, the deflector preferably has a configuration such that the light beam is deflected as a result of the reflection surface rotating about a rotary shaft; an opening is preferably formed in an area where the first scanning lens and the second scanning lens are disposed; and the first scanning lens and the second scanning lens are preferably provided so as to partially overlap each other in the opening along a direction of the rotary shaft. When the second scanning lens is caused to approach the photosensitive member; particularly, when the second scanning lens is a cylindrical lens which gathers a light beam in a sub-scanning direction intersecting the main scanning direction, the width of the second scanning lens in the sub-scanning direction must be increased, which is disadvantageous in miniaturization of the scanning unit. Placing the scanning lens at the above-described position is effective for miniaturizing the scanning unit by means of slimming-down of the scanning lens.

The thickness of the cylindrical lens in the sub-scanning direction can be set to about 6 mm or less. Further, an angle between the light beam entering the first reflection system optical element and a light beam having been reflected from the first reflection system optical element can be set to about 10° to 30°. The smaller angle is effective for slimming down the scanning unit.

The two ends of the second scanning lens can be respectively attached to two attachment sections provided on a lower surface of the base section, by way of attachment members. An attempt can be made to slim down the scanning unit by means of attaching not the center of the second scanning lens, but both ends of the same to the attachment sections.

Preferably, a positioning section of the second scanning lens is placed on either one of the two attachment sections. This is intended for preventing deterioration of image quality, which would otherwise be caused when the second scanning lens swells as a result of an increase in humidity or temperature. The second scanning lens is formed from resin by means of injection molding. When a gate section which is left in a resin injection section after molding is provided at one end of the second scanning lens, the positioning section is preferably provided on an attachment section to which an end opposite the one end is to be attached.

The scanning unit preferably assumes a substantially wedge-shaped geometry whose part close to the deflector is longer than a part close to the first reflection system optical system in a heightwise direction when a rim portion of the unit frame is viewed from the side.

The image forming apparatus preferably further includes: a process unit including the photosensitive member and a development device for rendering visible a latent image formed by means of exposing and scanning the photosensitive member. When a reclosable cover is provided on the side surface of a housing opposing the first reflection system optical element, a space through which the process unit passes can be easily assured by means of the essentially wedge-shaped geometry. As a result, attachment and removal of the process unit to and from the image forming apparatus by way of an opening formed when the cover is opened become easy.

An embodiment of the present invention will be described with reference to the drawings.

(1) Overall Configuration of a Laser Printer

FIG. 1 is a perspective view showing the appearance of a laser printer 1 according to an embodiment of an image forming apparatus.

The laser printer 1 shown in FIG. 1 has a top cover 18 which is to become an upper surface, and four side surfaces 2a, 2b, 2c, and 2d (side surfaces 2c and 2d are situated in positions where they remain invisible in FIG. 1). A portion of the top cover 18 is receded into a housing 2 to thus form a sheet output tray 72. A paper feed cassette 6 capable of housing a plurality of sheets of recording medium, such as recording paper, is detachably provided in a lower part of the housing 2 so as to be pulled out from a front side surface 2a of the housing 2. A manual feed tray section 11 to be used for individually setting a recording medium and a reclosable front cover 16 are provided in the front side surface 2a.

As indicated by phantom lines in FIG. 1, a pair of side frames 190b and 190d are provided on mutually-opposing inner side surfaces 2b and 2d, and a rigid-body plate 190, such as a steel plate, is provided between the side frames 190b and 190d at a position below the top cover 18 that serves as an upper surface of the housing 2. Each of the side frames 190b, 190d is formed from a steel plate or molded from resin, such as polystyrene or ABS (acrylonitrile-butadiene-styrene).

The configuration of the laser printer 1 will be described in more detail with reference to FIG. 2.

Figure 2:
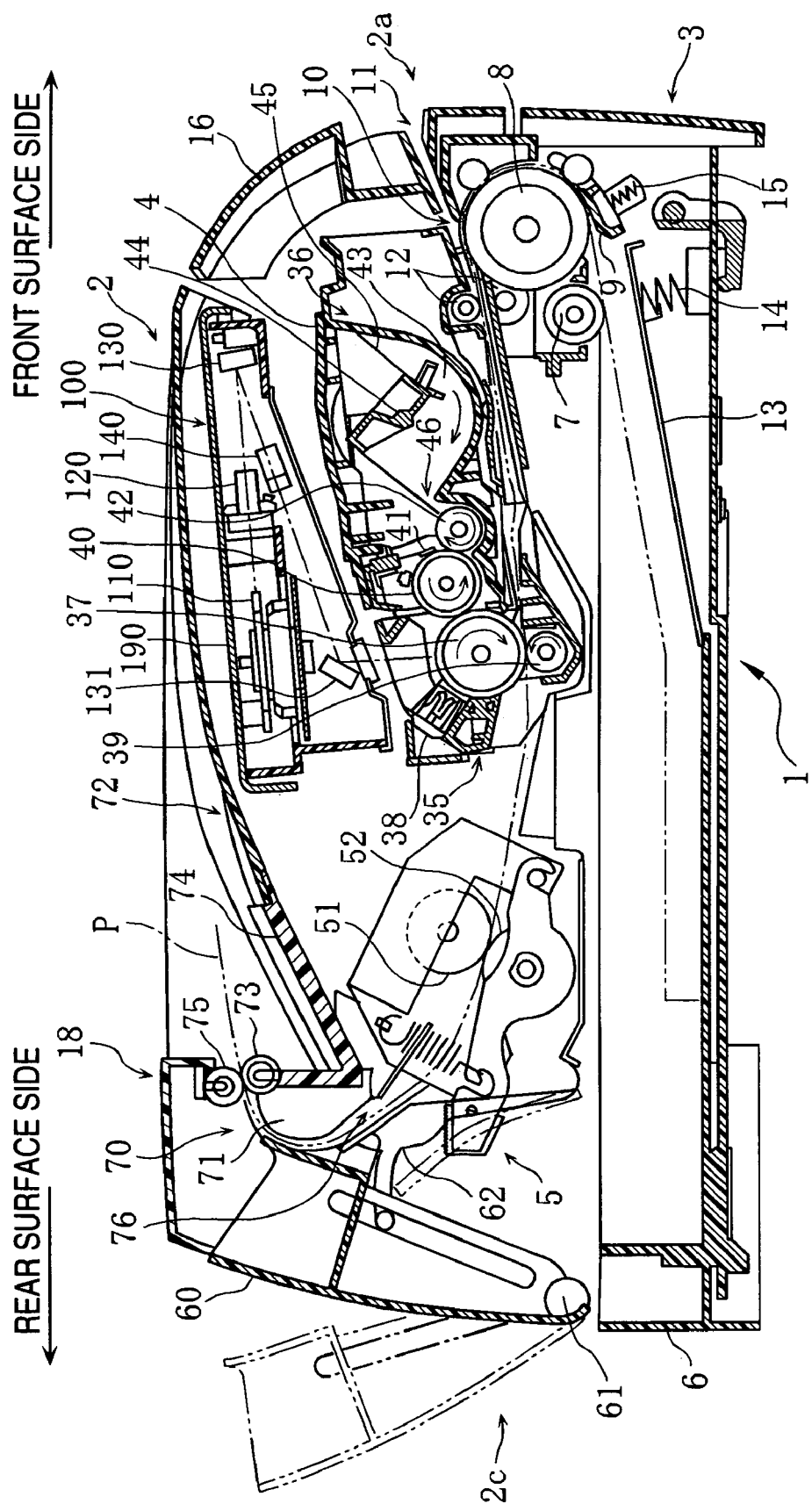
FIG. 2 is a schematic side cross-sectional view of the laser printer.

FIG. 2 is a schematic side-cross sectional view of the laser printer 1 when viewed from the side surface 2*d*.

The laser printer 1 includes, within the housing 2 having the top cover 18 serving as an upper surface, the front cover 16 provided on the front side surface 2*a*, and a rear cover 60 provided on the rear side surface 2*c*, a paper feed section 3 for feeding recording paper serving as a recording medium, or the like, a process cartridge 4 for forming a toner image which is a visible image on the fed recording medium, a fixing unit 5 for fixing on the recording medium the toner image formed on the same, and a paper output section 70 for outputting the recording medium having passed through the fixing unit 5. In the specification, among the four side surfaces 2*a* to 2*d* of the housing 2, a side surface on which the front cover 16 is to be mounted (i.e., a right side surface in FIG. 2) is taken as the front side surface 2*a*, and a side surface opposite to the front side surface is taken as the rear side surface 2*c*. The front side surface 2*a* and the rear side surface 2*c* are located on both sides in the recording medium transport direction.

The paper feed section 3 includes the paper feed cassette 6, paper feed rollers 7, 8 disposed at positions above the leading (front side) end of the recording mediums stacked in the paper feed cassette 6 in the recording medium transport direction, and a paper feed pad 9. A paper feed path 10 is formed in the paper feed section 3, wherein the paper feed path is a recording medium transport path which inverts the recording medium fed from the paper feed cassette 6 and transports the recording medium to a lower portion of the process cartridge 4. The paper feed section 3 is provided with a pair of registration rollers 12 facing the paper feed path 10. In addition to the recording medium loaded in the paper feed cassette 6, a recording medium (recording paper or the like) set in the manual feed tray section 11 is also fed to the paper feed path 10. In either case, after having been temporarily stopped by the pair of registration rollers 12, the recording medium is supplied to an image forming section of the process cartridge 4 at an image formation timing of the process cartridge 4.

The paper feed cassette 6 is provided below the process cartridge 4 and the fixing unit 5 and detachably attached from the front side surface 2*a* of the housing 2. A paper press plate 13 and a spring 14 are provided within the paper feed cassette 6. The paper press plate 13 enables laminated stacking of recording mediums, and an end of the paper press plate 13 distant from the paper feed roller 7 is supported in a pivotable manner, and an end of the same proximate to the paper feed roller 7 is vertically movable. Further, the spring 14 is provided so as to upwardly urge the rear surface of the end of the paper press plate 13 proximate to the paper feed roller 7. Therefore, as the amount of stacked recording mediums increases, the paper press plate 13 is pivoted downwardly against the restoration force of the spring 14 while the end section of the paper press plate 13 distant from the paper feed roller 7 is taken as a fulcrum.

The paper feed roller 8 and the paper feed pad 9 are provided so as to oppose to each other, and the paper feed pad 9 is pressed against the paper feed roller 8 by means of a spring 15 provided on the back of the paper feed pad 9. The top sheet of the recording mediums stacked on the paper press plate 13 comes into contact with and is pressed against the paper feed roller 7 by means of the spring 14 from the back of the paper press plate 13. The top recording medium is nipped between the paper feed roller 8 and the paper feed pad 9, and is separated on a per-sheet basis by means of the paper feed roller 8 and the paper feed pad 9 as a result of rotation of the paper feed roller 8. The recording medium is fed to the paper feed path 10.

The recording medium supplied from the paper feed cassette 6 or the manual feed tray section 11 is supplied to the pair of registration rollers 12 disposed at the positions above the paper feed roller 7 or the like. After having registered the fed recording medium, the pair of registration rollers 12 transport the recording medium to the image forming position (i.e., a position where a photosensitive drum 37 and a transfer roller 39 remain in contact with each other) within the process cartridge 4. The front side surface 2*a* of the housing 2 is provided with the front cover 16. The front cover 16 is provided which can be opened and closed with respect to the housing 2. The process cartridge 4 is removably inserted by way of an opening which appears when the front cover 16 is opened.

A scanning unit 100 provided at the position above the process cartridge 4 includes a laser diode 271 which emits a laser beam (see FIG. 3); a polygon mirror 110 which is rotated at high speed by means of a polygon motor 112 (see FIG. 4) and deflects the laser beam; an fθ lens (a first scanning lens) 120 which gathers the laser beam in the scanning direction (a main scanning direction) of the polygon mirror 110 and renders constant a scanning speed over the photosensitive drum 37; a cylindrical lens (a second scanning lens) 140 which gathers the laser beam in a sub-scanning direction (the rotating direction of the photosensitive drum 37) orthogonal to the main scanning direction; a first return mirror 130; and a second return mirror 131.

The laser beam which has been modulated on the basis of image information and emitted from the laser diode 271 passes through or undergoes reflection in sequence of the polygon mirror 110, the fθ lens 120, the first return mirror 130, the cylindrical lens 140, and the second return mirror 131, as indicted by a dashed line, thereby exposing and scanning the surface of the photosensitive drum 37.

The rigid-body plate (a steel plate in the embodiment) 190 constituting the upper surface of the hosing 2 is placed between the side frame 190*b* forming the side surface 2*b* and the side frame 190*d* forming the side surface 2*d* of the housing 2 (see FIG. 1) at an inner position below the top cover 18. This rigid-body plate 190 also serves as the upper cover of the scanning unit 100.

The process cartridge 4 includes a drum cartridge 35 and a development cartridge 36. The photosensitive drum 37, an charging device 38, and the transfer roller 39 are provided within the drum cartridge 35. As mentioned previously, the process cartridge 4 is removably attached to the inside of the housing 2 by way of the opening appearing when the front cover 16 is opened. The development cartridge 36 is removably attached to the drum cartridge 35 and has a development roller 40, a layer thickness regulation blade 41, a feed roller 42, and a toner hopper 43.

The toner housed in the toner hopper 43 is agitated by means of rotation of an agitator 45 supported by a rotary shaft 44 in the direction of arrow and discharged from a toner supply port 46 formed in the side of the toner hopper 43. The feed roller 42 is rotatably disposed beside the toner supply port 46. The development roller 40 is rotatably disposed so as to oppose the feed roller 42. The feed roller 42 and the development roller 40 remain in contact with each other in such a state where they compress each other to a certain extent.

The development roller 40 is formed by covering a metal roller shaft with a roller made of conductive rubber material and is rotated in the direction of an arrow in FIG. 2 (a counterclockwise direction). A development bias is applied to the development roller 40. The layer thickness regulation blade 41 is disposed in the vicinity of the development roller 40. In the layer thickness regulation blade 41, a press section, which has a semi-circular cross-sectional profile and is made of insulating silicon rubber, is provided at the extremity of a blade main body formed from a metal leaf spring material. The layer thickness regulation blade 41 is supported by the development cartridge 36 in the vicinity of the development roller 40, and the press section is brought into press contact against the development roller 40 by means of elastic force of the blade main body.

The toner discharged from the toner supply port 46 is supplied to the development roller 40 by means of rotation of the feed roller 42. At this time, the toner is subjected to positive frictional electrification between the feed roller 42 and the development roller 40. The toner supplied over the supply roller 40 enters between the press section of the layer thickness regulation blade 41 and the development roller 40 in association with rotation of the development roller 40, whereby the toner is carried by the development roller 40 as a thin layer of given thickness.

The photosensitive drum 37 is supported by the drum cartridge 35 so as to be rotatable in the direction of the arrow (a clockwise direction) at a position beside the development roller 40 in a state of opposing the same. The drum main body of this photosensitive drum 37 is grounded, and the surface of the photosensitive drum 37 is formed from a positively-chargable photosensitive layer made of polycarbonate or the like.

The charging device 38 is located above and to the left of the photosensitive drum 37, and spaced a predetermined interval from the photosensitive drum so as to oppose the same. This charging device 38 is of scorotoron type for positive electrification purpose which causes an electrification wire, such as tungsten, to effect corona discharge. The charging device 38 is configured to impart the surface of the photosensitive drum 37 with a uniform positive charge.

The transfer roller 39 is disposed at a position below the photosensitive drum 37 so as to oppose the same and is supported by the drum cartridge 35 so as to be rotatable in the direction of the arrow (a counterclockwise direction). The transfer roller 39 is constituted by covering a metal roller shaft with a roller made of conductive rubber material. At the time of transfer, a transfer bias is applied to the transfer roller 39.

In association with rotation of the photosensitive drum 37, the surface of the photosensitive drum 37 is imparted with a uniform positive charge by the charging device 38. Next, the surface of the photosensitive drum is exposed by a laser beam output from the scanning unit 100, whereby an electrostatic latent image is formed. Subsequently, when the photosensitive drum 37 opposes the development roller 40 and when the toner, which is carried by the development roller 40 and positively charged, opposes and comes into contact with the photosensitive drum 37, the electrostatic latent image is formed on the surface of the photosensitive drum 37 by the development bias applied to the development roller 40; that is, the toner is supplied to the areas on the surface of the uniformly-positively-charged photosensitive drum 37, which are exposed by the laser beam and whose electric potential is lowered, and selectively carried to thus form a toner image (reversal development).

Subsequently, the toner image carried by the surface of the photosensitive drum 38 is transferred onto a recording medium by means of the transfer bias applied to the transfer roller 39 while the recording medium passes between the photosensitive drum 37 and the transfer roller 39.

The fixing unit 5 is disposed at a position above the paper feed cassette 6, beside the process cartridge 4, and downstream of the process cartridge 4 in the transport direction of a recording medium. The fixing unit 5 includes, as fixing rollers, a heating roller 51 having an internal heater, and a pressing roller 52 which is disposed opposite the heating roller 51 and forced so as to press the heating roller.

The fixing unit 5 thermally fixes the toner image, which is a visible image transferred to the recording medium by the process cartridge 4, while the recording medium passes between the heating roller 51 and the pressing roller 52. Subsequently, the recording medium is fed to a paper output path 76, which is a recording medium transport path formed in the paper output section 70.

The paper output section 70 includes an inner guide member 71 and an outer guide member 62, which in combination constitute the paper output path 76; a lower paper output roller 73 and an upper paper output roller 75, which constitute a pair of paper output rollers which are provided at an outlet port used for outputting the recording medium to a sheet output tray 72 provided in the top cover 18; and a tray member 74 having a portion which constitutes a portion of the sheet output tray 72.

The outer guide member 62 constituting the paper output path 76 is configured so as to pivot toward a rear surface side of the housing 2 in synchronism with opening/closing action of the rear cover 60 provided on the rear surface 2c of the housing 2. When the rear cover 60 pivotally attached by way of a hinge 61 is opened, the upper portion of the outer guide member 62 pivots toward the rear surface side thereof in synchronism with the opening action of the rear cover 60. Thus, the paper output path 76 is viewed by way of an opening formed in the rear side surface 2c of the housing 2 as a result of opening of the rear cover 60.

The sheet output tray 72 has the shape of an essentially-rectangular plate when viewed from above and is configured such that a rear-surface-side end portion of the tray is recessed to thus form a recessed portion and such that the rear-surface-side end portion gradually slopes upward from the rear-surface-side end portion towards the front side. A region of the sheet output tray 72, which extends from the rear-side end portion to an arbitrary point on the upwardly-sloping portion, is formed from the tray member 74. The upper surface of the front-side (the lead-end-side in the transport direction of a recording medium) leading-end portion of the tray member 74 contacts a lower surface of the side edge portion of the tray member 74 of the top cover 18.

The paper traveling direction of the recording medium, which has passed through the fixing unit 5 and has been delivered to the paper output path 76, is reversed and moved upward by means of the inner guide member 71 and the outer guide member 62. The recording medium is delivered to the pair of paper output rollers. The recording medium is output onto the sheet output tray 72 toward the front by way of the pair of paper output rollers (73 and 75). The rigid-body plate 190 is provided so as to extend across a position immediately below the area of the sheet output tray 72 consisting of the top cover 18.

(2) Detailed Configuration of the Scanning Unit 100

The configuration of the scanning unit 100 of the present embodiment will now be described in detail.

Figure 3:
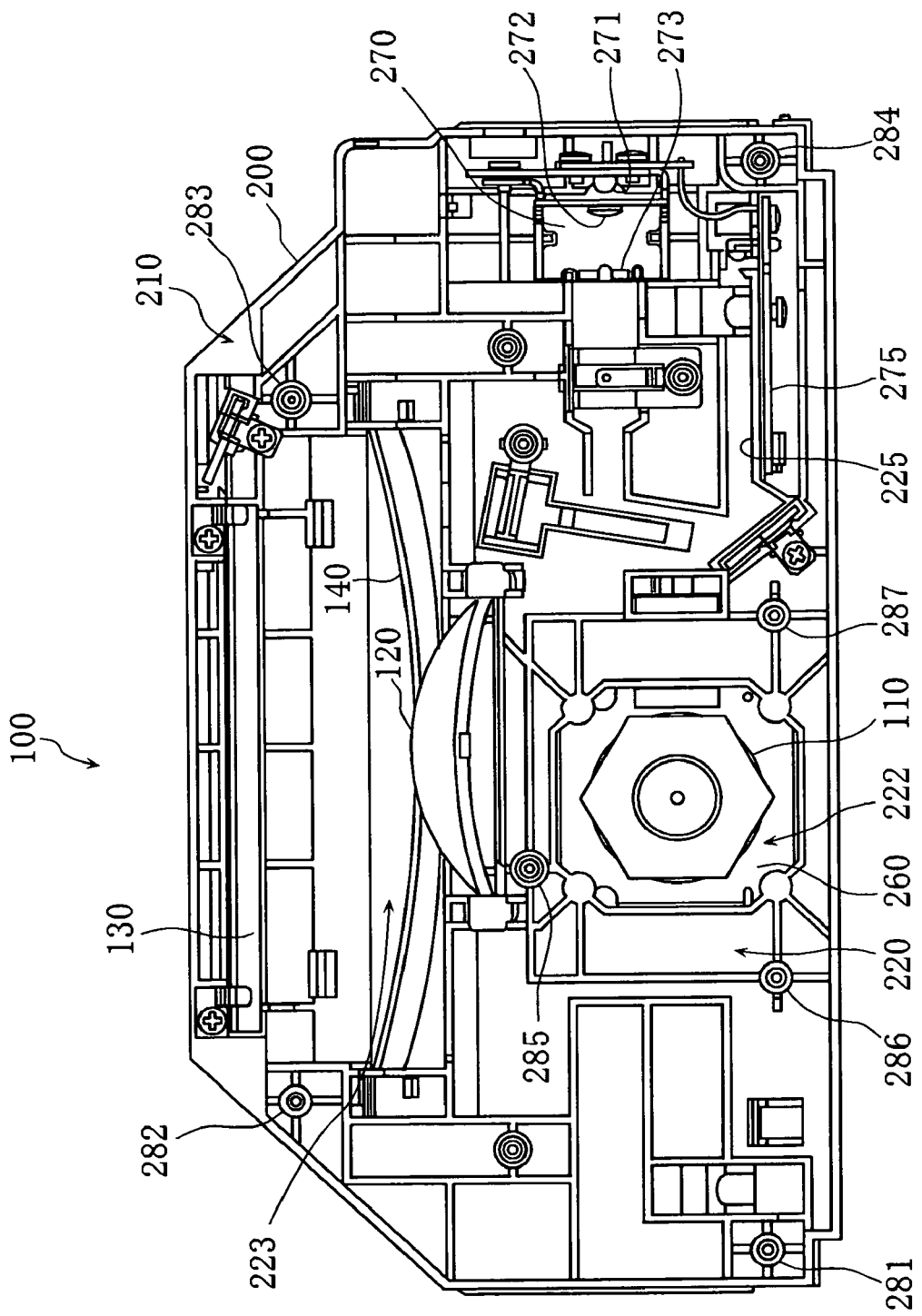
FIG. 3 is a top view for describing the configuration of a scanning unit.
Figure 4:
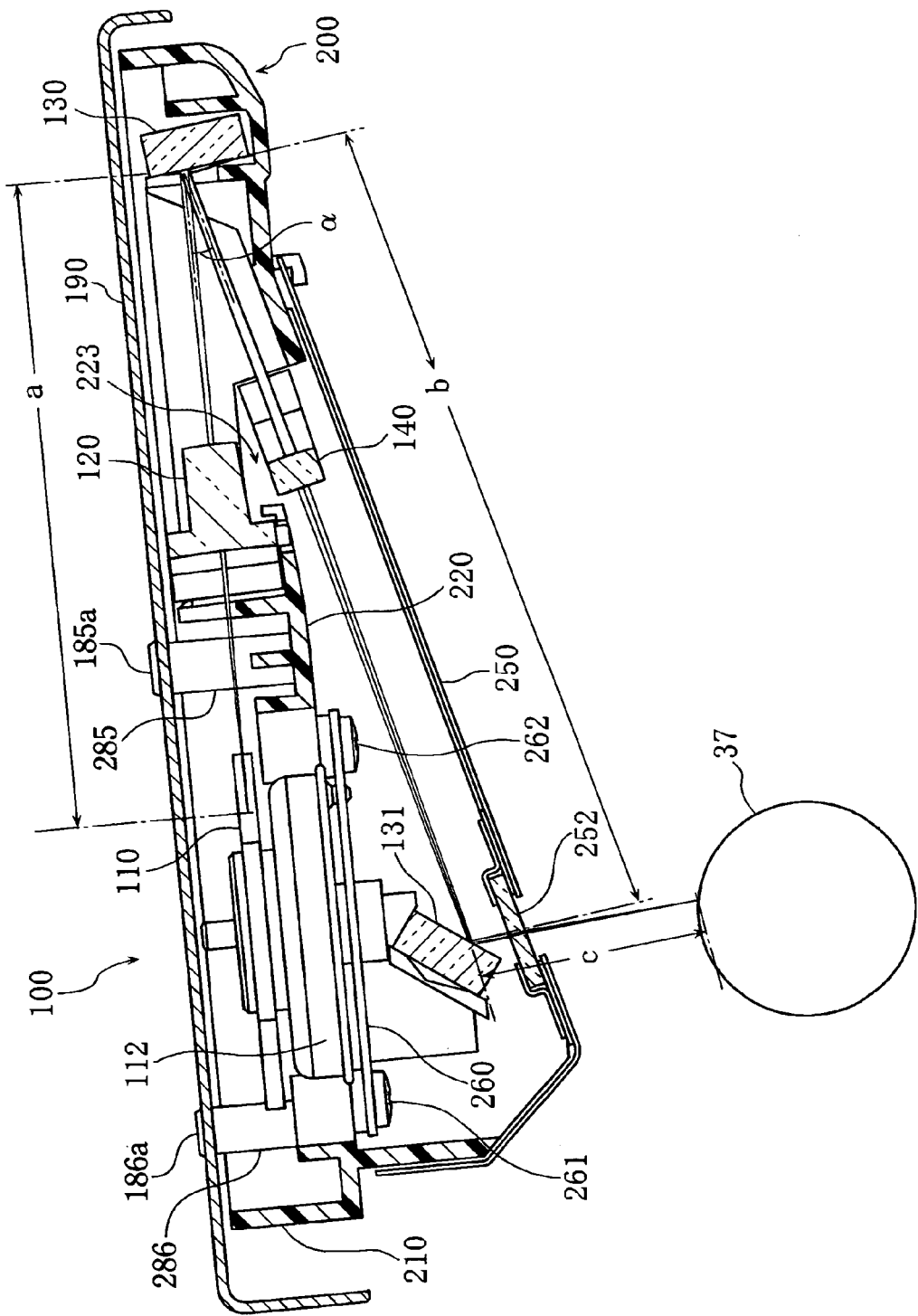
FIG. 4 is a schematic cross-sectional view of the scanning unit.

FIG. 3 is a top view for describing the configuration of the scanning unit 100, and FIG. 4 is a schematic cross-sectional view.

The scanning unit 100 has an opening 223 by way of which the laser beam travels from an area where the first return mirror 130 is mounted (i.e., the front side) to another area where the second return mirror 131 is mounted (i.e., the rear side). The scanning unit 100 further has a flat-plate-like base section 220 on which individual sections, such as the polygon mirror 110 and the fθ lens 120, are mounted; and a unit frame 200 having a rim portion 210 forming an outer peripheral wall surrounding an outer peripheral side of the base section 220 (FIG. 3). The unit frame 200 can be manufactured by integrally forming, e.g., fiberglass-impregnated resin, through injection molding.

An opening 222 is formed in an area on the base section 220 where the polygon motor 112 (FIG. 4) for rotating the polygon mirror 110 is to be mounted (FIG. 3). A substrate 260, on which the polygon mirror 112 is mounted, is fastened by screws 261 and 262 from below the opening 222, thereby rendering the scanning unit 100 slim (FIG. 4).

In the area of the base section 220 where the fθ lens 120 and the cylindrical lens 140 are to be mounted, the opening 223 is formed for causing the laser beam to pass from the upper side of the base section 220 (i.e., the part of the base section 220 facing the rigid-body plate 190) to the lower side of the base section 220 (the part of the base section 220 facing the photosensitive drum 37). The scanning unit 100 is also made slim by arranging the fθ lens 120 and the cylindrical lens 140 so as to overlap in the vicinity of the opening 223 when viewed from the traveling direction of the laser beam from the polygon mirror 110.

Further mounted on the base section 220 are the laser diode 271 for emitting a laser beam, a collimator lens 272 for collimating the emitted laser beam into parallel light, and an LD holder 270 equipped with a slit plate 273 having slits for shaping the parallel light (FIG. 3). An LD control substrate 275 for controlling driving of the laser diode 271 is mounted on a substrate attachment section 225 which is provided so as to upwardly protrude from the base section 220 toward the inside of the rim portion 210 from the base section 220 (FIG. 3). The substrate attachment section 225 is formed integrally with the base section 220 by means of injection molding.

The laser beam emitted from the laser diode 271 is deflected by the polygon mirror 110 to pass through the fθ lens 120 and undergoes reflection on the first return mirror 130 to thus travel downward (toward the lower side) of the base section 220 by way of the opening 223. Subsequently, the laser beam passes through the cylindrical lens 140 and undergoes reflection on the second return mirror 131 to thus pass through a glass plate 252 attached to the opening formed in a lower cover 250 of the scanning unit 100, thereby exposing the surface of the photosensitive drum 37 (FIG. 4).

The rigid-body plate 190 that is disposed so as to extend across the inside of the top cover 18 and constitutes the upper surface of the housing 2 also serves as the upper cover of the scanning unit 100, and the unit frame 200 is provided so as to hang down from the rigid-body plate 190.

Figure 5:
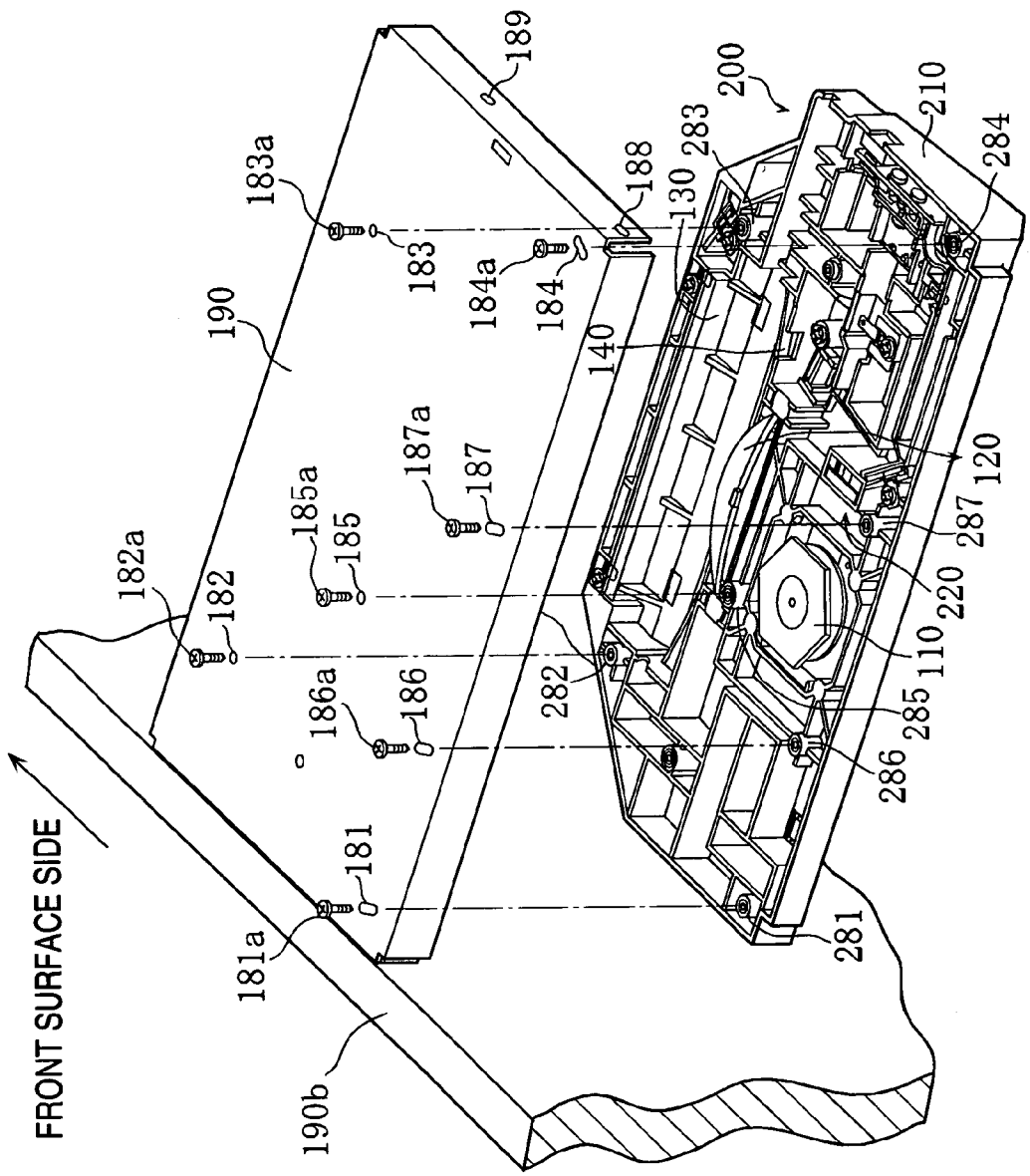
FIG. 5 is a perspective view for describing a case where a unit frame is fixed to a rigid-body plate.

FIG. 5 is a perspective view for describing the case where the unit frame 200 is fixed to the rigid-body plate 190.

Holes 188 and 189 formed in the sides of the rigid-body plate 190 are for use in fixing a positional relationship between the rigid body 190 and the side frame 190b shown in FIG. 1. Although not shown in FIG. 5, similar holes are formed in the side frame 190d as well.

Holes 181 to 187 are provided in areas of the rigid-body plate 190 corresponding to screw-hole pedestals 281 to 287 formed in the unit frame 200. By means of screws 181a to 187a inserted into the rigid-body plate 190 from above, the rigid body plate 190 and the unit frame 200 are fastened together.

The screw-hole pedestals 281 to 287 provided on the unit frame 200 are situated at positions on the base section 220 which are located further interior from the rim portion 210. Conventionally, screw holes are often formed in the rim portion 210. However, in the present embodiment, the screw-hole pedestals 281 to 284 are formed on the base section 220.

Each of the screw-hole pedestals 281 to 287 has a substantially-cylindrical shape, and the screw-hole pedestals 281 to 287 are provided so as to project slightly higher than the rim portion 210 in the direction of the rigid-body plate 190 (the screw-hole pedestals 285 and 286 are illustrated in FIG. 4). As mentioned previously, by means of the screw-hole pedestals 281 or the like being provided at positions on the base section 220 which are further interior from the rim portion 210, the unit frame 200 prevents deformation of the overall unit frame 200, which would otherwise be caused when the unit frame 200 is fastened to the rigid-body plate 190.

The unit frame 220 is formed by means of injection molding. The upper edge of the rim portion 210 of the unit frame usually may be formed with deteriorated precision and become wavy. However, the precision of the cylindrical screw-hole pedestals is comparatively high, and hence the cylindrical screw-hole pedestals are easily brought flush with each other. Accordingly, the screw-hole pedestals are made higher than the rim portion 210, and the screws are engaged into the screw-hole pedestals. Thereby, when compared with a case where screw holes are formed in the rim portion, the fixed positions become closer to the polygon mirror, which acts as a source of vibration, thereby hindering occurrence of vibration.

When the unit frame 200 is fastened to the rigid-body plate 190, a sponge (not shown) is interposed between the rim portion 210 and the rigid-body plate 190, thereby preventing intrusion of dust into the scanning unit 100.

The rims of the screw holes of the screw-hole pedestals 281 to 287 are made essentially identical in thickness with the individual portions, such as the rim portion 210 and the base section 220. When the unit frame 200 is cooled after injection molding, the periods of time required to cool the individual sections are made essentially equal to each other, thereby improving mass-productivity of the unit frame 200.

The three screw-hole pedestals 285 to 287 are disposed around the polygon motor 112 for driving the polygon mirror 110. In the embodiment, in order to make the unit frame 200 slim, the opening 222 is provided in the position where the polygon motor 112 of the base section 220 is provided (FIG. 3). The substrate 260, on which the polygon mirror 112 is mounted, is fastened by the screws 261 and 262 from below the opening 222 (FIG. 4). In such a case, particularly, vibration attributable to the polygon mirror 112 presents a problem. When the rigid-body plate 190 is fastened to the unit frame 200, at least three screw-hole pedestals are provided around the polygon mirror 112, thereby suppressing the vibration.

The screw-hole pedestals 285 to 287 provided at three areas around the polygon mirror 112 are preferably located at positions surrounding the drive shaft (the rotary shaft of the polygon mirror 110) of the polygon motor 112, in a triangular pattern formed from the three points corresponding to the three areas where the screw-hole pedestals are provided. However, as a matter of course, hindrance of the path of the laser beam that has been deflected by the reflection surface of the polygon mirror 110 and travels toward the fθ lens 120 and the return mirror 130 is not preferable. Therefore, the screw-hole pedestal 285 provided in the direction of the fθ lens 120 is disposed in the vicinity of a non-use area of the fθ lens 120 (the area of the lens through which no laser beam passes).

When the polygon mirror 110 is used as a deflector, if the distance between the polygon mirror 110 and the screw-hole pedestals 285 to 287 is too short, whistle-like sound may arise between the polygon mirror 110 and the screw-hole pedestal 285 during high-speed rotation of the polygon mirror 110. The locations where the screw-hole pedestals are to be provided are preferably determined within the range where no such sound arises. From the viewpoint of prevention of vibration, the positions where the screw-hole pedestals 285 to 287 are to be placed are preferably spaced at substantially equal distances from the drive shaft of the polygon motor 112 so as to become more analogous to an equilateral triangle.

Figure 6:
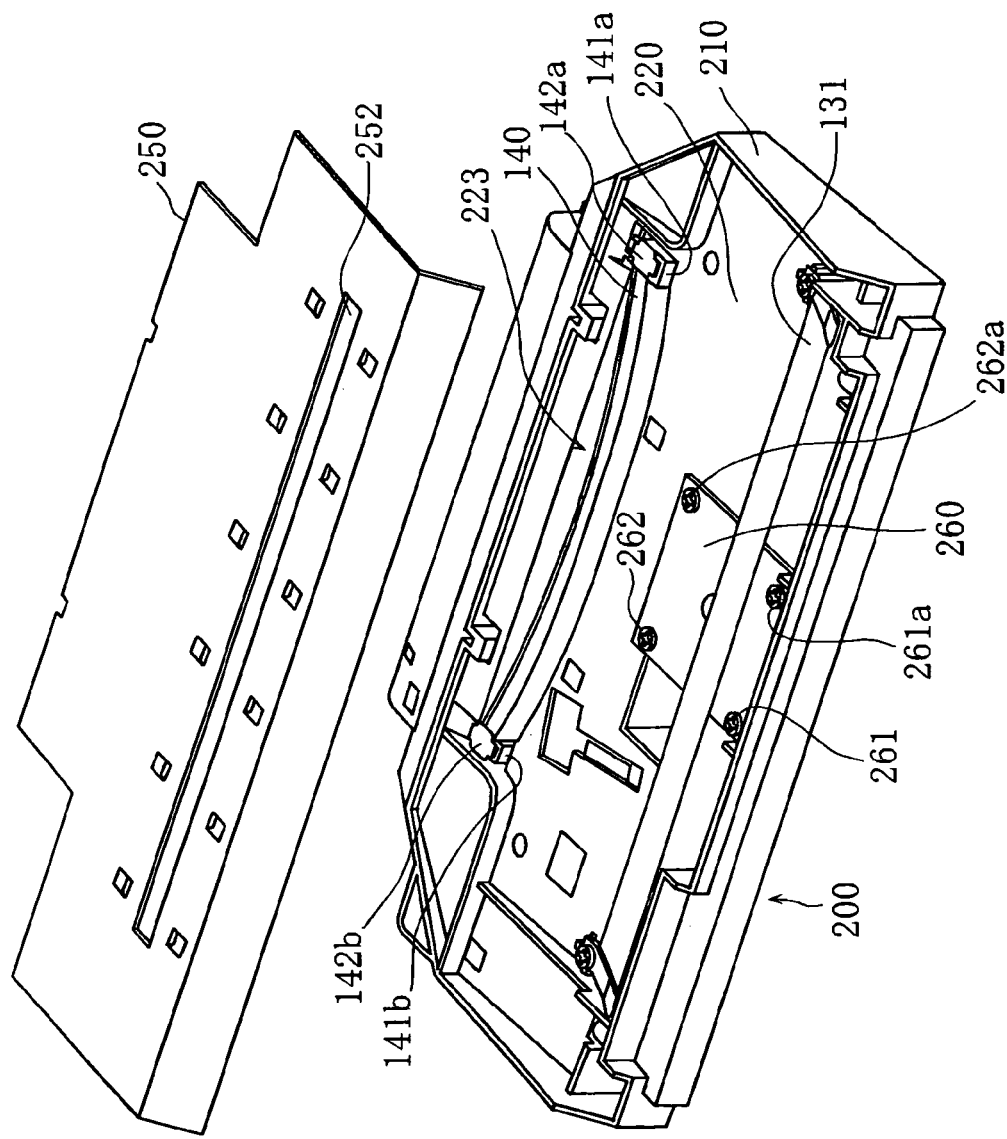
FIG. 6 is a perspective view for describing how a rear cover is attached to the back of the unit frame.

FIG. 6 is a perspective view for describing how the rear cover 250 is attached to the back side of the unit frame 200.

This drawing illustrates how the substrate 260 on which the polygon motor 112 is to be mounted is fastened from the back of the base section 220 by means of the screws 261 and 262 and screws 261a and 262a.

A pair of attachment sections 141a, 141b to be used for mounting the cylindrical lens 140 are formed integrally with the unit frame 200 in the vicinity of the opening 223, by means of injection molding. The cylindrical lens 140 is mounted by means of pieces of attachment clips 142a and 142b.

The rear cover 250 has an opening through which the light beam passes toward the photosensitive drum 37, and the glass plate 252 is attached to the opening. The rear cover 250 is formed from a rigid plate (a steel plate in the embodiment) which is thinner than the rigid-body plate 190. As mentioned above, deformation of the unit frame 200, which would otherwise arise when the unit frame is fastened to the rigid-body plate 190, is also prevented by making the strength of the rear cover 250 lower than that of the rigid-body plate 190. The rear cover 250 is not necessarily formed from a steel plate. A cover formed from, e.g., resin, can also be used as a rear cover, so long as the cover is lower in strength than the rigid body plate 190.

In the scanning unit 100 of the present embodiment, an angle a (hereinafter called a "return angle") between the laser beam entering the first return mirror 130 and the laser beam reflected from the first return mirror 130 is an acute angle of about 30° (FIG. 4). By means of making the return angle a small, the laser beam reflected from the first return mirror 130 is guided directly to the second return mirror 131, thereby slimming down the scanning unit. The return angle can be set to about 10° to 30°. The smaller return angle is advantageous in slimming down the scanning unit 100.

The first return mirror 130 and the second return mirror 131 are disposed in the vicinity of the outer peripheral wall. The second return mirror 131 is configured to be disposed at a position below the polygon mirror 110, by way of the base section 220. Specifically, the polygon mirror 110 and the second return mirror 131 are disposed at one of two mutually-opposing ends of the base section 220, and the first return mirror 130 is disposed at the other end of the two ends with the opening 223 interposed therebetween.

Given that an optical path length from a reflection surface of the polygon mirror 110 at the center of the optical beam in a main scanning direction to a reflection surface of the first return mirror 130 is taken as "a"; another optical path length from the reflection surface of the first return mirror 130 to a reflection surface of the second return mirror 131 is taken as "b"; and still another optical path length from the reflection surface of the second return mirror 131 to the surface of the photosensitive member 37 is taken as "c," a relationship of a<b and another relationship of c<b are satisfied. By means of placing the second return mirror 131 at a position below the polygon mirror 110, the optical path length "b" from the reflection surface of the first return mirror 130 to the reflection surface of the second return mirror 131 can be ensured long. Therefore, assurance of the long optical path length "b" is effective for shortening a distance between the scanning unit 100 and the photosensitive drum 37. This can contribute to miniaturization of the overall image forming apparatus.

In order to slim down the scanning unit 100, the thickness of the cylindrical lens 140 in the sub-scanning direction is slimmed down to about 6 mm. When viewed in a direction from the polygon mirror 110 to the first return mirror 130, the fθ lens 120 and the cylindrical lens 140 are arranged in such a positional relationship that they partially overlap each other in a direction parallel to the axis of the rotary shaft of the polygon mirror 110 (FIG. 4). As mentioned above, arrangement of the cylindrical lens 140 in the area of the opening 223 (particularly a position closer to the first return mirror 130 than to the fθ lens 120) contributes to slimming down of the cylindrical lens 140 as well. As the cylindrical lens 140 is located closer to the photosensitive drum 37, the thickness of the cylindrical lens 140 in the sub-scanning direction is increased, thereby posing difficulty in slimming down of the cylindrical lens.

Figure 7:
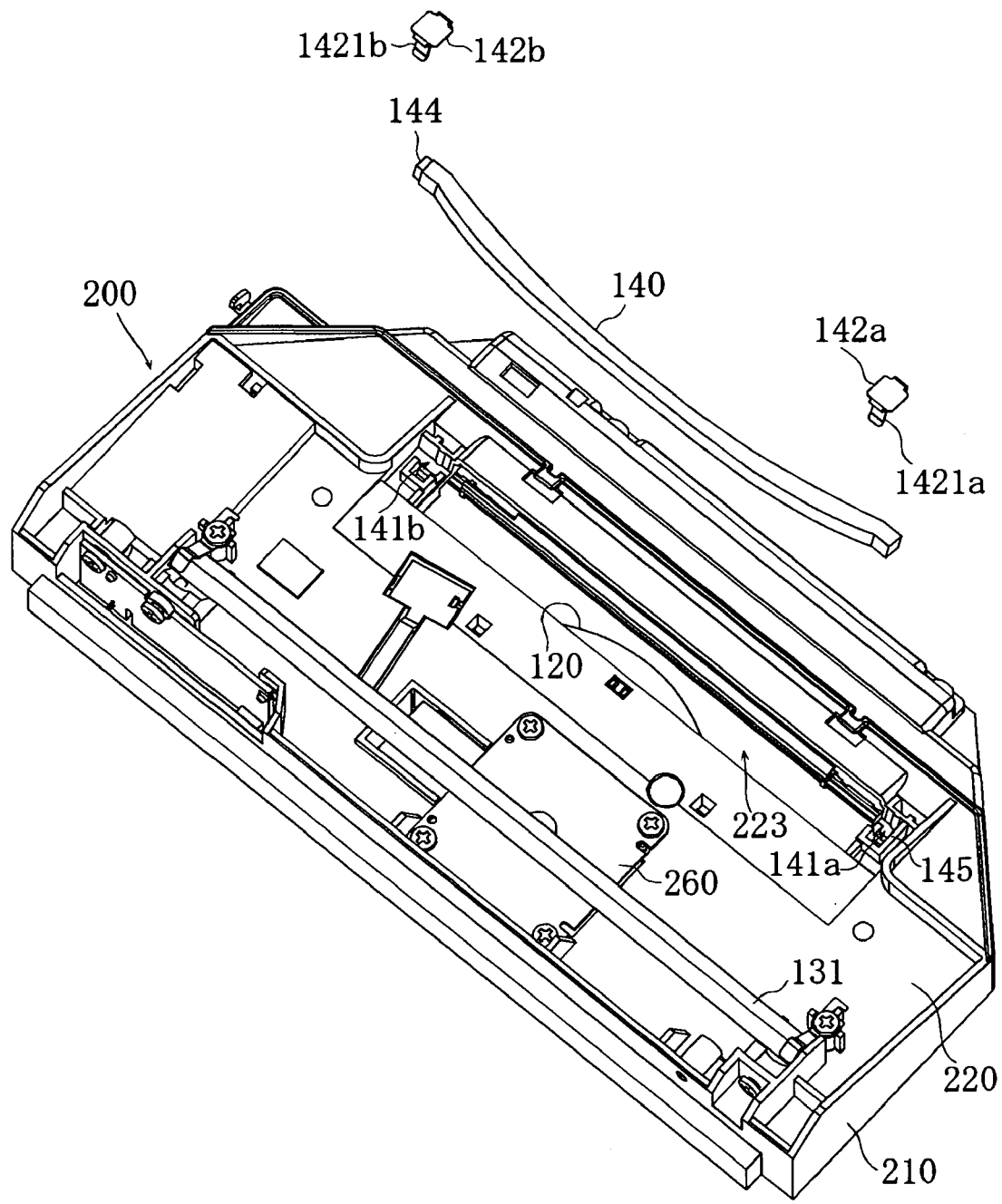
FIG. 7 is a perspective view for describing a case where a cylindrical lens is attached to the back of a base section.

FIG. 7 is a perspective view for describing how the cylindrical lens 140 is attached to the rear surface of the unit frame 200.

A pair of attachment sections 141a, 141b to be used for attaching the cylindrical lens 140 are formed in the vicinity of the opening 223 and integrally with the unit frame 200 by means of injection molding. The cylindrical lens 140 is attached by means of pieces of attachment clips 142a, 142b.

The attachment clip 142a has a section formed into the shape of a leaf spring as a leg section 1421a, and the attachment clip 142b has a section formed into the shape of a leaf spring as a leg section 1421b. The leg sections 1421a, 1421b of the pieces of the attachment clip 142a, 142b are interposed between the attachment sections 141a, 141b at the respective ends of the cylindrical lens 140 with the respective ends of the cylindrical lens 140 being loosely attached to the attachment sections 141a, 141b, thereby fixing the cylindrical lens 140 to the back of the base section 220.

The cylindrical lens 140 is formed from resin through injection molding. A gate section 144 is left on one end which comes into contact with the resin injection section when the lens is removed from a molding die. In the meantime, a positioning section 145 to be used for positioning the cylindrical lens 140 is provided in an attachment section 141a formed in the position opposite that of the gate section 144. As a result of the end opposite to the gate section 144 is being provided so as to come into contact with the positioning section 145, the cylindrical lens 140 is positioned.

In general, the cylindrical lens 140 has hitherto been positioned in the center with respect to the main scanning direction. In the scanning unit 100 of the embodiment, an opening 223 is formed in a position on the base section 220, where the cylindrical lens 140 is to be attached, for miniaturization purpose. This makes it difficult to position the cylindrical lens 140 in the center with respect to the main scanning direction. In contrast, when the positioning sections are provided at both ends, there arises apprehension that a characteristic of the cylindrical lens is deteriorated when the lens becomes inflated for reasons of moisture absorption, a temperature hike, or the like.

In the present embodiment, the cylindrical lens 140 is positioned by means of only the end section opposite to the gate section 144, whereby the lens is positioned while the influence of inflation of the lens is minimized. The attachment clip 142b used for fastening the cylindrical lens 140 assumes a shape which allows inflation of the lens in the main scanning direction (deformation of the lens due to inflation or the like is not inhibited by a leaf spring 1421b). Deterioration of the characteristic of the lens and fracture of the lens can be prevented by means of the shape of the attachment clip 142b.

As has been described above, the scanning unit of the present embodiment enables making of an attempt to miniaturize the scanning unit while required optical path lengths are ensured within the scanning unit. An attempt can be made to slim down the scanning unit and miniaturize the image forming apparatus by means of shortening the distance between the scanning unit and the photosensitive member which is an object of scanning. In the scanning unit of the present embodiment, a circumferential wall assumes an essentially-wedge-shaped geometry when viewed in sideways. As shown in FIG. 2, the front cover 16 side of the scanning unit 100 is further slimmed down. Hence, when the front cover 16 is opened, a space which enables passage of the process cartridge 4 is easily formed in a lower portion of the scanning unit 100, thereby enabling making of an attempt to slim down the image forming apparatus.

(Modification)

Although the embodiment of the present invention has been described thus far, it goes without saying that the present invention is not limited to the specific example described in connection with the embodiment. For instance, the following modification can also be performed.

(1) The embodiment has described a configuration in which the three screw-hole pedestals 285 to 287 to be provided around the polygon motor 112 are provided at three positions around the polygon motor 112. However, any number of positions may be employed, so long as the number is equal to three or more. Moreover, this embodiment has also described a configuration in which one screw-hole pedestal 285 is provided at a position around the polygon motor close to the f lens 120. However, two screw-hole pedestals can also be provided at two positions around the polygon motor close to the fθ lens 120. In this case, as a matter of course, the two screw-hole pedestals are disposed in a nonuse area of the fθ lens 120 (i.e., two locations; that is, right and left positions, when viewed from the optical axis of the fθ lens 120).

(2) The embodiment has described a configuration in which the laser beam reflected from the first reflection mirror 130 is caused to directly enter the second return mirror 131 provided on the back of the base section 220. Employment of such an optical path is suitable for miniaturizing the scanning unit 100. However, there may also be employed a configuration where an additional return mirror is interposed between the first return mirror 130 and the second return mirror 131.

(3) In the embodiment, the opening 222 is formed in the position on the base section 220 where the polygon mirror 110 and the polygon motor 112 are mounted. Although this configuration is suitable for making the scanning unit 100 slim, the substrate on which the polygon motor 112 is to be mounted may be provided on the front side of the base section 220 without forming the opening 222. Even when the substrate is provided on the front side of the base section 220, there can be yielded an advantage of miniaturization resulting from the scanning unit 100 hanging from the rigid-body plate 190.

Also, even when the substrate is provided on the front of the base section 220, an advantage of miniaturization may be yielded by means of forming the optical path of the laser beam into such a shape as shown in FIG. 4 through use of the first return mirror 130 and the second return mirror 131.

(4) Although the above-described embodiment has used the polygon mirror 110 and the polygon motor 112 as a deflector for deflecting a laser beam, the deflector is not limited to them. For instance, a galvano mirror or the like can also be used as the deflector. In this case, the scanning lens is not limited solely to the fθ lens 120, but use of a lens of another optical characteristic is also conceivable.

(5) The above embodiment has described attachment of the cylindrical lens 140. As a matter of course, the similar attachment method can be applied to the fq lens 120. More specifically, an attachment section to be used for attaching both ends of the fq lens 120 are provided on the front side of the unit frame 200. A space between both ends of the fq lens 120 and the attachment section can fixed through use of the attachment hardware.

The present invention can be applied to an image forming apparatus equipped with a scanning unit which emits a light beam and scans an object of scanning, such as a photosensitive member, as well as to a scanning unit.

What is claimed is:

1. An image forming apparatus comprising:
a photosensitive member;
a scanning unit that exposes and scans a surface of the photosensitive member by emitting a light beam, the scanning unit including a unit frame that has a base section having an opening and an outer peripheral wall surrounding a rim of the base section;
a deflector that is disposed on an upper surface side of the base section and deflects the light beam toward the outer peripheral wall;
a first reflection optical element that is disposed with the opening being interposed between the first reflection optical element and the deflector and reflects the light beam, which has been deflected by the deflector and travels toward the outer peripheral wall, toward a position below the base section; and
a second reflection optical element that is disposed on a lower surface side of the base section and reflects the light beam, which travels after having been reflected by the first reflection optical element and passed through the opening, toward the photosensitive member;
wherein an angle between the light beam entering the first reflection optical element and the light beam reflected from the first reflection optical element toward the second reflection optical element is an acute angle; and
a relationship of a<b and another relationship of c<b are satisfied, given that an optical path length from a reflection surface of the deflector to a reflection surface of the first reflection optical element is taken as "a"; another optical path length from the reflection surface of the first reflection optical element to a reflection surface of the second reflection optical element is taken as "b"; and still another optical path length from the reflection surface of the second reflection optical element to the surface of the photosensitive member is taken as "c."

2. The image forming apparatus according to claim 1, wherein the deflector is disposed at one of two opposing ends of the upper surface of the base section;
the first reflection optical element is disposed at the other end of the two ends; and
the second reflection optical element is disposed via the base section at the one end of the two ends and a position below the deflector.

3. The image forming apparatus according to claim 1, wherein the scanning unit comprises:
a first scanning lens interposed between the deflector and the first reflection optical element; and
a second scanning lens interposed between the first reflection optical element and the second reflection optical element.

4. The image forming apparatus according to claim 3, wherein the deflector has a rotary shaft about which the reflection surface of the deflector rotates to deflect the light beam;
the opening is formed in an area where the first scanning lens and the second scanning lens are disposed; and
the first scanning lens and the second scanning lens are provided so as to partially overlap each other in the opening along a direction of the rotary shaft.

5. The image forming apparatus according to claim 3, wherein the second scanning lens is a cylindrical lens that gathers a light beam in a sub-scanning direction intersecting a main scanning direction.

6. The image forming apparatus according to claim 5, wherein a thickness of the cylindrical lens in the sub-scanning direction is about 6 mm or less.

7. The image forming apparatus according to claim 1, wherein an angle between the light beam entering the first reflection optical element and the light beam having been reflected from the first reflection optical element is about 10° to 30°.

8. The image forming apparatus according to claim 4, wherein both ends of the second scanning lens are respectively attached to two attachment sections provided on a lower surface of the base section by attachment members.

9. The image forming apparatus according to claim 8, wherein a positioning section of the second scanning lens is provided on either one of the two attachment sections.

10. The image forming apparatus according to claim 9, wherein the second scanning lens is formed from resin by injection molding and has a gate section that is left in a resin injection part after molding is performed at one end of the second scanning lens; and
the positioning section is provided on the attachment section to which an end opposite to the one end of the second scanning lens is to be attached.

11. The image forming apparatus according to claim 1, wherein the scanning unit has a substantially wedge-shaped geometry whose part close to the deflector is longer than a part close to the first reflection optical element in a height-wise direction in a side view of a rim portion of the unit frame.

12. The image forming apparatus according to claim 11, further comprising a process unit including the photosensitive member and a development device for rendering visible a latent image formed by exposing and scanning the photosensitive member; and
a cover capable of being opened and closed which is provided on a side surface of a housing on a first reflection optical element side;
wherein the process unit is removably attached to the image forming apparatus through an opening formed when the cover is opened.

13. The image forming apparatus according to claim 1, wherein the optical path length "a" is a length from a reflection surface of the deflector that is located at a center of said optical beam in a main scanning direction to a reflection surface of said first reflection system optical element.

14. A scanning unit that exposes and scans an object of scanning by emitting a light beam, comprising:
a unit frame that has a base section having an opening and an outer peripheral wall surrounding a rim of the base section;
a deflector that is disposed on an upper surface side of the base section and deflects the light beam toward the outer peripheral wall;
a first reflection optical element that is disposed with the opening being interposed between the first reflection optical element and the deflector and reflects the light beam, which has been deflected by the deflector and travels toward the outer peripheral wall, toward a position below the base section; and
a second reflection optical element that is disposed on a lower surface side of the base section and reflects the light beam, which travels after having been reflected by the first reflection optical element and passed through the opening, toward the photosensitive member;
wherein an angle between the light beam entering the first reflection optical element and the light beam reflected from the first reflection optical element is an acute angle; and
a relationship of a<b is satisfied, given that an optical path length from a reflection surface of the deflector to a reflection surface of the first reflection optical element is taken as "a" and another optical path length from the reflection surface of the first reflection optical element to a reflection surface of the second reflection optical element is taken as "b."

* * * * *